United States Patent
Christnacher et al.

(10) Patent No.: US 10,550,268 B2
(45) Date of Patent: Feb. 4, 2020

(54) FIBRE REACTIVE FORMAZAN DYES, THEIR PREPARATION AND THEIR USE

(71) Applicant: Huntsman International LLC, The Woodlands, TX (US)

(72) Inventors: Hubert Jean-Luc Christnacher, Dietwiller (FR); Fanny Ehret, Reiningue (FR); Athanassios Tzikas, Dornach (CH); Rainer Hildebrand, Lörrach (DE); Michael Nicollet, Village-Neuf (FR)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 16/047,969

(22) PCT Filed: Dec. 6, 2016

(86) PCT No.: PCT/EP2016/079828
§ 371 (c)(1),
(2) Date: Jul. 27, 2018

(87) PCT Pub. No.: WO2017/129297
PCT Pub. Date: Aug. 3, 2017

(65) Prior Publication Data
US 2019/0002699 A1     Jan. 3, 2019

(30) Foreign Application Priority Data
Jan. 29, 2016 (EP) .................................... 16153367

(51) Int. Cl.
*C09B 62/503* (2006.01)
*C09D 11/328* (2014.01)
*D06P 5/30* (2006.01)
*D06P 1/38* (2006.01)
*D06P 3/66* (2006.01)

(52) U.S. Cl.
CPC ........ *C09B 62/5036* (2013.01); *C09D 11/328* (2013.01); *D06P 5/30* (2013.01); *D06P 1/38* (2013.01); *D06P 3/66* (2013.01)

(58) Field of Classification Search
None
See application file for complete search history.

(56) References Cited

U.S. PATENT DOCUMENTS

| | | | |
|---|---|---|---|
| 4,024,123 A | 5/1977 | Dussy et al. | |
| 4,370,145 A | 1/1983 | Schwaiger et al. | |
| 4,556,706 A | 12/1985 | Hegar et al. | |
| 4,720,542 A | 1/1988 | Omura et al. | |
| 4,754,023 A | 6/1988 | Tzikas et al. | |
| 4,906,736 A | 3/1990 | Schwaiger et al. | |
| 4,935,500 A | 6/1990 | Omura et al. | |
| 8,864,850 B2 * | 10/2014 | Tzikas ................ C09B 67/0042 8/546 |

FOREIGN PATENT DOCUMENTS

| | | |
|---|---|---|
| GB | 1155149 A | 6/1969 |
| WO | 2005090485 A1 | 9/2005 |
| WO | 2007085574 A2 | 8/2007 |

OTHER PUBLICATIONS

PCT International Search Report for patent application PCT/EP2016/079828, dated Mar. 13, 2017, 3 pages.
Espacenet English abstract of WO2007085574, publication date Aug. 2, 2007, 1 page.
Venkataraman, The Chemistry of Synthetic Dyes, vol. VI, pp. 287 to 297, Academic Press New York and London (1972).
Ullmanns Encyklopadie der technischen Chemie, vol. 11, pp. 714 to 718, Verlag Chemie (1976).

* cited by examiner

*Primary Examiner* — Kamal A Saeed
(74) *Attorney, Agent, or Firm* — Huntsman International LLC; Monique Raub

(57) ABSTRACT

A reactive dye of formula

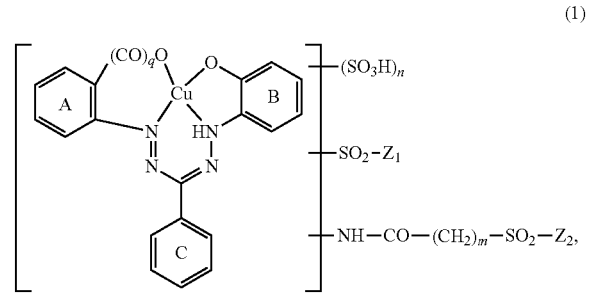

(1)

wherein
$Z_1$ and $Z_2$ are each independently of the other vinyl or a radical —$CH_2$—$CH_2$—Y and Y is a group removable under alkaline conditions,
n is the number 1, 2, 3 or 4,
m is the number 2, 3 or 4,
q is the number 0 or 1, and
the substituents —$(SO_3H)_n$, —$SO_2$—$Z_1$ and —NH—CO—$(CH_2)_m$—$SO_2$—$Z_2$ are bound to the benzene rings A, B and/or C, said benzene rings A, B and/or C are optionally further substituted by at least one substituent selected from the group $C_1$-$C_4$alkyl, $C_1$-$C_4$alkoxy and halogen,
is suitable for dyeing and printing cellulosic or amide-group-containing fibre materials.

15 Claims, No Drawings

FIBRE REACTIVE FORMAZAN DYES, THEIR PREPARATION AND THEIR USE

CROSS-REFERENCE TO RELATED APPLICATIONS

This application is the National Phase of International Application PCT/EP2016/079828 filed Dec. 6, 2016 which designated the U.S. and which claims priority to European App. No. 16153367.4 filed Jan. 29, 2016. The noted applications are incorporated herein by reference.

FIELD OF INVENTION

The present invention relates to blue dyeing formazan dyes having two fibre reactive groups, to a process for the preparation thereof and to the use thereof in dyeing or printing textile fibre materials.

BACKGROUND OF THE INVENTION

Fibre reactive formazan dyes which can be used for the dyeing and printing of hydroxyl-group-containing or nitrogen-containing fibre materials, such as cotton or wool, are known and described, for example, in U.S. Pat. Nos. 4,024,123, 4,370,145, 4,556,706, 4,720,542, 4,754,023, 4,906,736, 4,935,500, and WO2007085574.

Nowadays reactive dyes are required that have sufficient substantivity and at the same time have good ease of washing off of unfixed dye. They should also have a good tinctorial yield and high reactivity, the objective being to provide especially dyeings and prints having high degrees of fixing. The dyes should also yield dyeings and prints having good all-round fastness properties, for example light-fastness and wet-fastness properties. The fibre reactive formazan dyes hitherto known do not satisfy all these requirements. In particular, dyeings prepared with the known dyestuffs have insufficient wash- and chlorine fastness.

The problem underlying the present invention is accordingly to find, for the dyeing or printing of fibre materials, novel improved blue dyeing fibre reactive dyes having the qualities characterised above to a high degree.

DETAILED DESCRIPTION

The present invention accordingly relates to a reactive dye of formula

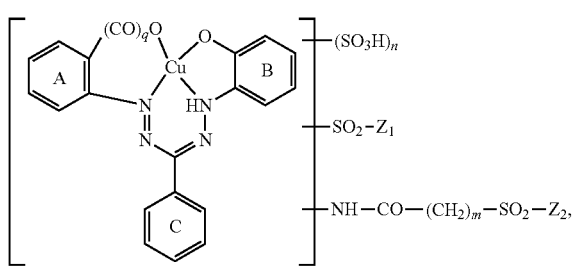

(1)

wherein
$Z_1$ and $Z_2$ are each independently of the other vinyl or a radical —$CH_2$—$CH_2$—Y and Y is a group removable under alkaline conditions,
n is the number 1, 2, 3 or 4,
m is the number 2, 3 or 4,
q is the number 0 or 1, and
the substituents —$(SO_3H)_n$, —$SO_2$—$Z_1$ and —NH—CO—$(CH_2)_m$—$SO_2$—$Z_2$ are bound to the benzene rings A, B and/or C, said benzene rings A, B and/or C are optionally further substituted by at least one substituent selected from the group $C_1$-$C_4$alkyl, $C_1$-$C_4$alkoxy and halogen.

As $C_1$-$C_4$alkyl there come into consideration, for example, methyl, ethyl, n-propyl, isopropyl, n-butyl, sec-butyl, tert-butyl or isobutyl, preferably methyl or ethyl.

As $C_1$-$C_4$alkoxy there come into consideration, for example, methoxy, ethoxy, n-propoxy, isopropoxy, butoxy or isobutoxy, preferably methoxy or ethoxy, and especially methoxy.

As halogen there come into consideration, for example, fluorine or chlorine, preferably chlorine.

A group Y removable under alkaline conditions may be, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl or —$OSO_2$—$N(C_1$-$C_4$alkyl)$_2$. Y is preferably a group of formula —Cl, —$OSO_3H$, —$SSO_3H$, —OCO—$CH_3$, —OCO—$C_6H_5$ or —$OPO_3H_2$, especially —Cl or —$OSO_3H$.

Examples of suitable radicals $Z_1$ and $Z_2$, each independently of the other, are accordingly vinyl, β-bromo- or β-chloro-ethyl, β-acetoxyethyl, β-benzoyloxyethyl, β-phosphatoethyl, β-sulfatoethyl and β-thiosulfatoethyl. $Z_1$ and $Z_2$ in the dye of formula (1) according to the present invention are, each independently of the other, preferably vinyl, β-chloroethyl or β-sulfatoethyl.

Preferably, n is the number 2 or 3, especially 2.
Preferably, m is the number 3.
Preferably, q is the number 1.

In one embodiment of the present invention the benzene rings A, B and/or C of the dye of formula (1) are devoid of further substituents from the group $C_1$-$C_4$alkyl, $C_1$-$C_4$alkoxy and halogen.

A preferred embodiment of the present invention is directed to a reactive dye of formula (1),
wherein
$Z_1$ and $Z_2$ are each independently of the other vinyl or a radical —$CH_2$—$CH_2$—Y and Y is —Cl or —$OSO_3H$,
n is the number 2,
m is the number 3,
q is the number 1, and
the benzene rings A, B and/or C are devoid of further substituents from the group $C_1$-$C_4$alkyl, $C_1$-$C_4$alkoxy and halogen.

In a particularly preferred embodiment of the present invention the reactive dye of formula (1) is a dye of formula

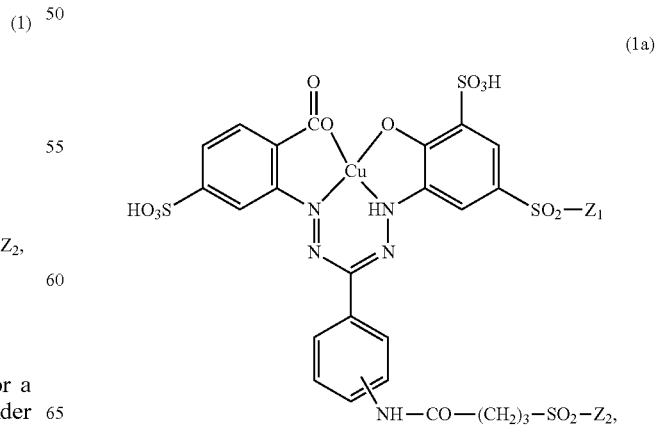

(1a)

wherein $Z_1$ is vinyl or a radical —CH$_2$—CH$_2$—Y and Y is —OSO$_3$H, and $Z_2$ is vinyl or a radical —CH$_2$—CH$_2$—Y and Y is —Cl.

In one embodiment of the dye of formula (1a) the group —NH—CO—(CH$_2$)$_3$—SO$_2$—Z$_2$ is in the meta-position.

The present invention relates also to a process for the preparation of the reactive dye of formula (1), which comprises reacting with one another an amine compound of formula

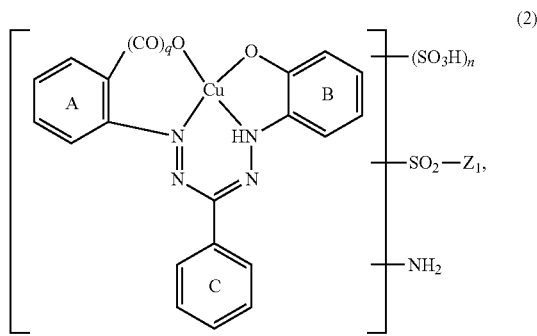

(2)

and a compound of formula

X—CO—(CH$_2$)$_m$—SO$_2$—Z$_2$ (3), wherein X is a replaceable group, for example halogen, and $Z_1$, $Z_2$, n, m, q, and the other possible substituents have the meanings and preferred meanings given above. The substituents —(SO$_3$H)$_n$, —SO$_2$—Z$_1$ and —NH$_2$ are bound to the benzene rings A, B and/or C, said benzene rings A, B and/or C are optionally further substituted by at least one substituent selected from the group C$_1$-C$_4$alkyl, C$_1$-C$_4$alkoxy and halogen.

The compound of formula (2) is preferably a compound of formula

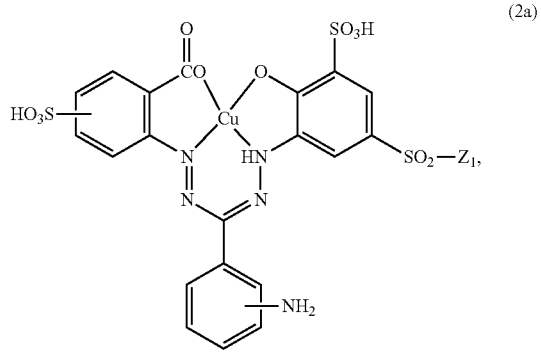

(2a)

wherein $Z_1$ has the meaning and preferred meaning given above.

The compound of formula (3) is preferably an acid halide, in particular an acid chloride, that is, X is preferably halogen, in particular chlorine. Specific examples are: Cl—CO—(CH$_2$)$_3$—SO$_2$—(CH$_2$)$_2$—Cl, Cl—CO—(CH$_2$)$_4$—SO$_2$—(CH$_2$)$_2$—Cl, Cl—CO—(CH$_2$)$_2$—SO$_2$—(CH$_2$)$_2$—Cl, Cl—CO—(CH$_2$)$_3$—SO$_2$—CH=CH$_2$.

The compound of formula (3) is known per se or can be prepared similarly to known compounds as described, for example in GB-A-1155149.

The amine compound of formula (2) is preferably converted with the compound of formula (3) in aqueous solution, emulsion or suspension, at low temperature, for example 0° C. to 40° C., and at weakly acid, neutral or weakly alkaline pH. Advantageously, the hydrogen halide released in the course of the condensation reaction is continuously neutralized by the addition of aqueous alkali metal hydroxides, carbonates or bicarbonates The amine compound of the formula (2) are known per se or can be prepared similarly to known compounds. Concerning the preparation of the copper complexes of tetradentate formazans, reference is made to K. Venkataraman, The Chemistry of Synthetic Dyes, Volume VI, pages 287 to 297, Academic Press New York and London (1972); Ullmanns Encyklopadie der technischen Chemie, Volume 11, pages 714 to 718, Verlag Chemie (1976); U.S. Pat. Nos. 4,024,123; 4,720,542; 4,754,023 (Example 38); U.S. Pat. Nos. 4,906,736; 4,935,500; and WO2007085574.

The amine compound of formula (2) can be prepared, for example, by coupling the diazonium compound of an aromatic amine of the formula

(4)

with a hydrazone compound of the formula

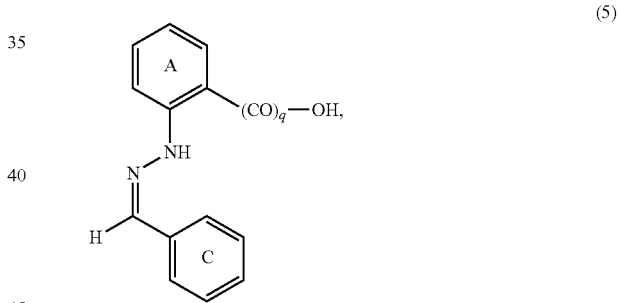

(5)

wherein the substituents —(SO$_3$H)$_n$, —SO$_2$—Z$_1$ and —NH$_2$ are bound to the benzene rings A, B and/or C, said benzene rings A, B and/or C are optionally further substituted by at least one substituent selected from the group C$_1$-C$_4$alkyl, C$_1$-C$_4$alkoxy and halogen, $Z_1$, n, q, and the other substituents having the meanings and preferred meanings given above, and reacting the formazan dyestuff obtained, simultaneously or subsequently, with an agent introducing copper, to form the amine compound of formula (2).

The hydrazone compound of formula (5) is obtained by condensation of the corresponding phenylhydrazine with a suitable benzaldehyde. The phenylhydrazine can be prepared in a manner known per se, for example, by reduction of the corresponding diazonium compound with salts of sulfurous acid. The condensation reaction is preferably carried out without intermediate isolation of the phenylhydrazine. Suitable phenylhydrazines and benzaldehydes are selected such that they contain the substituents bound to the benzene rings A and C as indicated above.

Suitable benzaldehydes which can be used as starting compounds for the preparation of the hydrazones of formula (5) are, for example, benzaldehyde, 2-, 3- or 4-methylbenzaldehyde, 4-methylbenzaldehyde-3-sulfonic acid, 2-, 3- or 4-methoxybenzaldehyde, 4-methoxy-3-chloro-benzaldehyde, 2-, 3- or 4-nitrobenzaldehyde, 2-, 3- or 4-aminobenzaldehyde, 2- or 4-chlorobenzaldehyde, 2,4-dichloro-benzaldehyde, 2-chlorobenzaldehyde-5-sulfonic acid, benzaldehyde-2-sulfonic acid, benzaldehyde-3-sulfonic acid, benzaldehyde-4-sulfonic acid, and benzaldehyde-2,4-di sulfonic acid.

Suitable aromatic amines which can be used as starting compounds for the corresponding phenylhydrazines are, for example, aminophenol, 4- or 5-methyl-2-aminophenol, 4- or 5-sulfo-2-aminophenol, 4-sulfo-6-carboxy-2-aminophenol, 4-methoxy-2-aminophenol, 4-bromo-2-aminophenol, 2-aminobenzoic acid, 2-amino-5-sulfobenzoic acid, 2-amino-4-sulfobenzoic acid, 5-chloro-2-aminobenzoic acid, and 5-methoxy-2-aminobenzoic acid.

The aromatic amine of the formula (4) used as the starting compound can be prepared in a manner which is known per se, for example, by reacting 4-(β-hydroxyethylsulfonyl)-2-amino-phenol-6-sulfonic acid with concentrated sulfuric acid, which preferably contains sulfur trioxide, and, if appropriate, converting the esterified and sulfated compound prepared into the corresponding 4-(β-thiosulfatoethylsulfonyl)- or 4-vinyl-sulfonyl-2-aminophenol-6-sulfonic acid.

The amine compound of formula (2a) can be prepared, for example, by coupling the diazonium compound of an aromatic amine of the formula

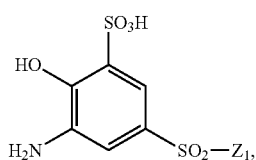

(4a)

with a hydrazone compound of the formula

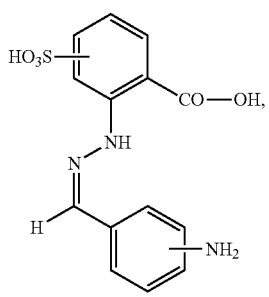

(5a)

wherein
$Z_1$ has the meaning and preferred meaning given above, and reacting the formazan dyestuff obtained, simultaneously or subsequently, with an agent introducing copper, to form the amine compound of formula (2a).

The hydrazone compound of formula (5a) can be prepared, for example, by diazotisizing 2-amino-4-sulfobenzoic acid, reduction of the diazonium salt of 2-amino-4-sulfobenzoic acid into the hydrazine thereof, and condensation of 2-carboxy-phenylhydrazine-5-sulfonic acid and nitrobenzaldehyde to form the hydrazone compound of formula

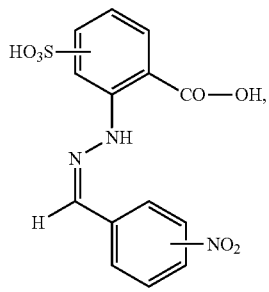

(5b)

wherein the nitro group is, for example, in the 3-position. Alternatively, 2- or 4-nitrobenzaldehyde can be used, or a mixture of at least two compounds of 2-, 3- and 4-nitrobenzaldehyde. The compound of formula (5a) is obtained by reduction of the nitro group of the compound of formula (5b).

The process to prepare the amine compound of formula (2) is analogous to known procedures for the preparation of metal complex formazan dyestuffs. The process according to the invention is preferably carried out at a pH value of 4 to 8, in particular of 5 to 7, and at a temperature of from 0° C. and 25° C.

Appropriately, the hydrazone compound of formula (5) is dissolved in water at room temperature with an alkali, such as sodium hydroxide solution or sodium carbonate; the pH value is preferably kept at 6 to 8. The diazonium salt solution of the amine of the formula (4) is then added. The reaction solution is kept at a pH value of from 3 to 8. Preferably, the reaction is carried out at a pH value of from 5 to 7, in particular of from 6 to 7. The reaction temperature should not exceed 25° C., advantageously 15° C. At the same time, that is to say together with or after the addition of the diazonium compound, the equimolar amount of the agent which introduces copper is added, for example in the form of copper sulfate in aqueous solution. The metallization reaction is advantageously carried out at a pH value of from 4 to 8, in particular of from 6 to 7. The metallization reaction and coupling reaction can proceed side by side. Advantageously, the reaction mixture is adjusted to a pH value of about 1 before isolation of the amine compound, for example, by addition of concentrated hydrochloric acid or sulfuric acid and agitation of the mixture at room temperature for about one hour. Afterwards the reaction mixture is adjusted to a pH value of 4 to 6 and the amine compound of formula (2) is isolated in a customary manner, for example, by addition of an electrolyte, such as sodium chloride or potassium chloride. If appropriate, the amine compound of formula (2) obtained can also be isolated by evaporating the solution, such as, for example, by spray-drying. Alternatively, the reaction mixture containing the amine compound of formula (2) may be used in the subsequent reaction with the compound of formula (3) without isolation.

Possible agents which introduce copper are, for example, the simple salts and the complex salts of copper, such as, for example, copper sulfate, copper chloride, copper acetate or copper carbonate, and the copper salts of salicylic acid or tartaric acid.

If the copper salts of mineral acids are used, it is expedient to carry out the reaction in the presence of an acid-buffering agent, such as, for example, an alkali metal hydroxide or carbonate or alkaline earth metal hydroxide or carbonate or an alkali metal salt of a lower alkanecarboxylic acid, such as acetic acid, or a basic alkali metal salt of phosphoric acid. These alkali metal compounds or alkaline earth metal compounds are, in particular, the sodium, potassium and calcium compounds, and preferably, for example, sodium hydroxide, potassium hydroxide, calcium hydroxide, sodium carbonate and potassium carbonate, calcium carbonate, sodium bicarbonate, sodium acetate, disodium hydrogen phosphate and trisodium phosphate.

The agent which introduces copper is used in equimolar amounts, so that one copper atom is introduced per one molecule of the compound to be formed, of the formula (2). The metallization usually already goes to completion at room temperature.

The end product may optionally be subjected to a further transformation reaction. Such a transformation reaction is, for example, conversion of the radical $Z_1$ or $Z_2$ having the meaning —$CH_2CH_2$—Y, wherein Y is as defined above, into the vinyl form by treatment with dilute sodium hydroxide solution, e.g. conversion of the β-sulfatoethylsulfonyl or β-chloroethylsulfonyl group into the vinylsulfonyl radical. Such reactions are known per se.

Because the individual process steps mentioned above may be carried out in different orders as well as, where appropriate in some cases, simultaneously, different process variants are possible. The reaction is generally carried out in stepwise succession, the order of the simple reactions, known per se, between the individual reaction components being determined by the particular conditions.

The reactive dye of formula (1) according to the present invention is present either in the form of the free acid or, preferably, in the form of a salt thereof. Salts that come into consideration are, for example, the alkali metal, alkaline earth metal and ammonium salts or the salts of an organic amine. Sodium, lithium, potassium and ammonium salts and the salts of mono-, di- and tri-ethanolamine may be mentioned as examples.

The fibre-reactive dyes according to the invention are suitable for dyeing and printing, in particular for printing, a wide variety of materials, especially hydroxyl-group-containing or nitrogen-containing fibre materials. Examples include paper, silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention accordingly relates also to the use of reactive dyes according to the invention in the dyeing or printing of hydroxyl-group-containing or nitrogen-containing, especially cotton-containing, fibre materials, or in other words, a process for the dyeing or printing of hydroxyl-group-containing or nitrogen-containing fibre materials, wherein a reactive dye of formula (1) is used.

The reactive dyes according to the invention can be applied to the fibre material and fixed to the fibre in a variety of ways, especially in the form of aqueous dye solutions or dye print pastes. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength and a high fibre-dye binding stability in both the acidic and the alkaline range, and also good fastness to light and very good wet-fastness properties, such as fastness to washing, to water, to seawater, to cross-dyeing and to perspiration. In particular, the dyeings and prints obtained exhibit improved chlorine- and wash fastness properties compared to known dyes.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by mixing together the individual components in the desired amount of water.

As substrates there come into consideration the above-mentioned hydroxyl-group-containing or nitrogen-containing fibre materials, especially cotton fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$-$C_6$alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6-hexane-triol; and $C_1$-$C_4$alkyl ethers of polyhydric alcohols, e.g. 2-methoxyethanol, 2-(2-methoxy-ethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin, inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may also be mentioned are, for example, those based on poly(meth)acrylic acids or poly(meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)-benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is, for example, a 20% by weight solution of 1,2-benzisothiazolin-3-one in dipropylene glycol (Proxel® GXL).

The inks may in addition comprise further additives, such as fluorinated polymers or telomers, for example polyethoxyperfluoroalcohols (Forafac® or Zonyl® products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The dyes of the present invention show very good build-up behaviour, a high end build-up and a high degree of fixation, especially in printing applications on cellulosic fibre materials.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to litres.

Example 1

(a) 377.4 parts of 4-(β-sulfatoethylsulfonyl)-2-aminophenol-6-sulfonic acid, finely suspended in 3300 parts of water, are diazotized at pH 1 and 20° C. by addition of 69 parts of sodium nitrite. The reaction mixture is stirred for one hour and excess nitrite is destroyed by addition of sulfamic acid. 250 parts of copper-(II)-sulfate (×5H$_2$O) are then added to the diazonium salt mixture obtained.

(b) 282 parts of 2-amino-4-sulfobenzoic acid are finely suspended in a mixture of 2000 parts of water and 500 parts of crushed ice. The pH of the suspension is adjusted to a value below 1. Diazotization is carried out by addition of 90 parts of sodium nitrite at 0° C., and the temperature of the mixture is allowed to increase to 20° C. The reaction mixture is stirred for one hour and excess nitrite is destroyed by addition of sulfamic acid.

(c) 90 parts of an aqueous sodium hydroxide solution (30 wt %) are added to 700 parts of water and the solution is heated to a temperature of 60 to 65° C. Subsequently, 352 parts of sodium disulfite are added to the heated solution, and the suspension of the diazonium salt obtained according to (b) is added over 1 to 1.5 hours at 65° C., upon which the pH arrives at a value of 6 to 6.5.

(d) 151 parts of 3-nitrobenzaldehyde are added under stirring to the solution of the hydrazine obtained according to (c). The pH of the mixture is adjusted to a value below 1 by addition of 500 parts of hydrochloric acid (32%), and heated to a temperature of 70 to 75° C. A precipitate of the nitrophenylhydrazone is formed upon stirring of the mixture at 70 to 75° C. for approximately 6 h.

(e) The pH of the suspension of the nitrophenylhydrazone obtained according to (d) is adjusted to 8 by addition of 800 parts of aqueous sodium hydroxide (30 wt %). At 70° C. 168 parts of sodium hydrogen sulfide are added and stirring is continued for 4 to 6 hours. After cooling of the reaction mixture with 2000 parts of crushed ice, 560 parts of potassium chloride are added at approximately 40° C. The pH of the reaction mixture is adjusted to 3 and the precipitated product is separated by filtration, which yields 268 parts of the aminophenylhydrazone as a wet filter cake.

(f) 268 parts of the aminophenylhydrazone obtained according to (e) are finely suspended in 4000 parts of water, and the pH of the suspension is adjusted to a value of 7 to 8 by addition of an aqueous sodium hydroxide solution (30 wt %). The mixture of the diazonium salt obtained according to (a) is added to the suspension of the aminophenylhydrazone. The pH is maintained at 7 by addition of an aqueous sodium hydroxide solution (30 wt %) and the temperature is kept at 20° C. by cooling with crushed ice. After the addition, stirring is continued for 30 minutes to complete the reaction. The pH is adjusted to 1 by addition of 672 parts of hydrochloric acid (32%) and stirring is continued for another hour at 10 to 20° C. Aqueous sodium hydroxide solution (30 wt %) is then added to adjust the mixture to pH 4 to 5.

(g) The mixture obtained according to (f) is cooled to a temperature below 5° C. by means of 3500 parts of crushed ice, and adjusted to pH 6 to 7 by means of an aqueous sodium carbonate solution. To this mixture are slowly added 205 parts of β-chloroethylsulfonyl butyryl chloride by maintaining the pH at 6 to 7 and the temperature below 5° C. The reaction mixture is stirred for 1.5 hours to complete the reaction, and the pH is then adjusted to 6 by addition of hydrochloric acid (32%). The dyestuff obtained is isolated by methods commonly known in the art, for example, by desalting using a dialysis membrane. 784 parts of the crude dyestuff are obtained ($\lambda_{max}$: 608 nm) which main component, in the form of the free acid, corresponds to the formula

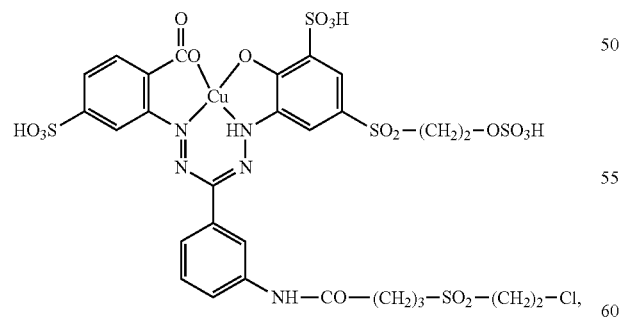

(101)

Examples 2-7

The following dyes, each of which dyes cellulose in a blue shade with good all-round fastness properties, can be prepared in a manner analogous to that described in Example 1, wherein $\lambda_{max}$ for the dye of formula (105) is 614 nm, and $\lambda_{max}$ for the dye of formula (107) is 598 nm.

2

(102)

3

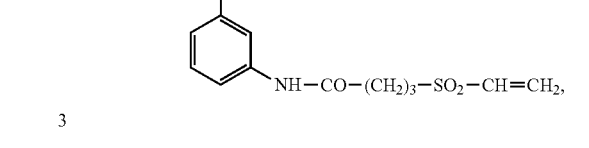

(103)

4

(104)

5

(105)

6

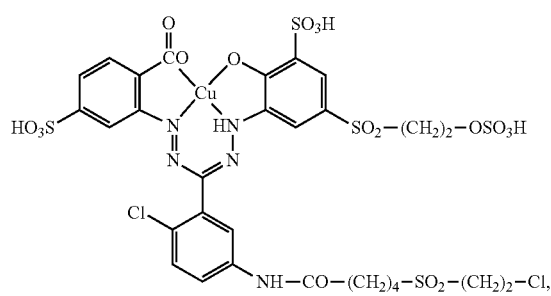

(106)

7

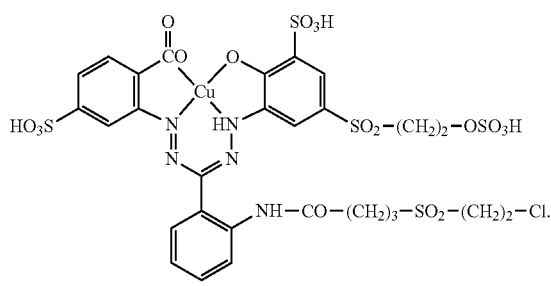

(107)

Pad Batch Dyeing:

On a padder having a squeezing effect of 75% (70%) liquor pick-up, a bleached (mercerized) cotton cretonne fabric is impregnated with an aqueous dyeing liquor containing, per litre, X g of the dyestuff of formula (101) obtained according to Example 1, 1 g of a wetting agent (ALBAFLOW® PAD), Y ml of sodium hydroxide 36° Bé and 70 ml of sodium silicate (water glass) 38° Bé (see Table 1). The immersion time is 2 seconds. After padding, the fabric is rolled up and then stored for 24 hours at a temperature of 25° C. After storage, the dyed cotton material is cold-rinsed with water (10 min), boiled in water (5 min) and subsequently cold-rinsed with water (10 min). Blue shaded fabrics of different colour depths are obtained with the dyeing liquors 1 to 5 dependent on the dyestuff concentration (X g/l).

TABLE 1

Composition of dyeing liquors 1 to 5 containing the dyestuff of Example 1

| | Dyebath | | | | |
|---|---|---|---|---|---|
| | 1 | 2 | 3 | 4 | 5 |
| Dyestuff* of Ex. 1 [X g/l] | 10 | 20 | 40 | 60 | 80 |
| Water glass 38 Bé [ml/l] | 70 | 70 | 70 | 70 | 70 |
| Caustic soda 36 Bé [Y ml/l] | 15 | 18 | 24 | 30 | 33 |

*$E_{25}$ = 0.450 ($E_{25}$ means the extinction at $\lambda_{max}$ = 608 nm/c = 25 mg/l)

The tinctorial strengths of the dyeings are measured photospectrometrically. Table 2 summarizes the build-up properties. The dyestuff prepared according to Example 1 shows very good build-up properties.

TABLE 2

Build-up: dependence of reference depth (RD) from dyestuff concentration

| | Dyebath | | | | |
|---|---|---|---|---|---|
| | 1 | 2 | 3 | 4 | 5 |
| Dyestuff of Ex. 1 [X g/l] | 10 | 20 | 40 | 60 | 80 |
| Co cretonne bleached | 0.27 | 0.53 | 0.99 | 1.34 | 1.62 |
| Co cretonne mercerized | 0.46 | 0.91 | 1.64 | 2.15 | 2.43 |

A bleached cotton cretonne fabric dyed according to the above method with 40.4 g/l of the dyestuff of formula (101) (reference depth: 1.00) is subjected to colour fastness testing to chlorine bleach (ISO 105/E03). Changes in colour are determined according to the Grey Scale. The fabric is rated 4-5.

A bleached cotton cretonne fabric dyed according to the above method with 40.4 g/l of the dyestuff of formula (101) (reference depth: 1.00) is subjected to colour fastness testing to peroxide wash at 95° C. (E2S ISO 105/C06). Changes in colour are determined according to the Grey Scale. The fabric is rated 4-5.

Dyeing Instructions I:

2 parts of the dye obtained according to Example 1 are dissolved in 400 parts of water; 1500 parts of a solution which comprises 53 g of sodium chloride per litre are added. 100 parts of cotton fabric are introduced into this dyebath at 40° C. After 45 minutes, 100 parts of a solution which comprises 16 g of sodium hydroxide and 20 g of calcined sodium carbonate per litre are added. The temperature of the dyebath is kept at 40° C. for a further 45 minutes. Thereafter, the dyed goods are rinsed, soaped at the boil with a non-ionic detergent for a quarter of an hour, rinsed again and dried.

Dyeing Instructions II:

2 parts of the reactive dye obtained according to Example 1 are dissolved in 400 parts of water; 1500 parts of a solution which comprises 53 g of sodium chloride per litre are added. 100 parts of cotton fabric are introduced into this dyebath at 35° C. After 20 minutes, 100 parts of a solution which comprises 16 g of sodium hydroxide and 20 g of calcined sodium carbonate per litre are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a non-ionic detergent for a quarter of an hour, rinsed again and dried.

Dyeing Instructions III:

8 parts of the reactive dye obtained according to Example 1 are dissolved in 400 parts of water; 1400 parts of a solution which comprises 100 g of sodium sulfate per litre are added. 100 parts of cotton fabric are introduced into this dyebath at 25° C. After 10 minutes, 200 parts of a solution which comprises 150 g of trisodium phosphate per litre are added. Thereafter, the temperature of the dyebath is increased to 60° C. in the course of 10 minutes. The temperature is kept at 60° C. for a further 90 minutes. Thereafter, the goods are rinsed, soaped at the boil with a non-ionic detergent for a quarter of an hour, rinsed again and dried.

Printing Instructions I:

3 parts of the reactive dye obtained according to Example 1 are sprinkled with high-speed stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the printed material obtained is steamed in saturated steam at 102° C. for 2 minutes. The printed fabric is then rinsed, soaped at the boil and rinsed again, if appropriate, and then dried.

Printing Instructions II:

(a) Mercerised cotton satin is pad-dyed with a liquor containing 30 g/l of sodium carbonate and 50 g/l of urea (70% liquor pick-up) and dried.

(b) Using a drop-on-demand ink-jet head (bubble jet), the cotton satin pretreated according to Step (a) is printed with an aqueous ink containing 15% by weight of the reactive dye according to Example 1, 15% by weight of 1,2-propylene glycol and 70% by weight of water.

The print is dried completely and fixed in saturated steam for 8 minutes at 102° C., cold-rinsed, washed off at the boil, rinsed again and dried.

What is claimed is:

1. A reactive dye of formula

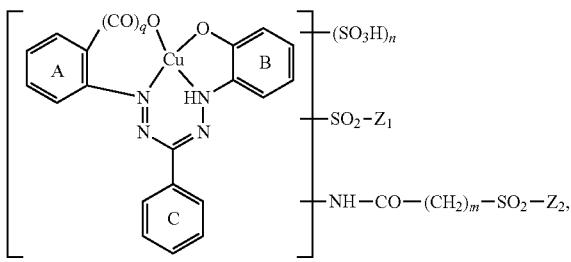

(1)

wherein $Z_1$ and $Z_2$ are each independently of the other vinyl or a radical —$CH_2$—$CH_2$—Y and Y is a group removable under alkaline conditions, n is the number 1, 2, 3 or 4, m is the number 2, 3 or 4, q is the number 0 or 1, and the substituents —$(SO_3H)_n$, —$SO_2$—$Z_1$ and —NH—CO—$(CH_2)_m$—$SO_2$—$Z_2$ are bound to the benzene rings A, B and/or C, and said benzene rings A, B and/or C are optionally further substituted by at least one substituent selected from the group $C_1$-$C_4$ alkyl, $C_1$-$C_4$ alkoxy and halogen.

2. A reactive dye according to claim 1, wherein Y is —Cl, —Br, —F, —$OSO_3H$, —$SSO_3H$, —OCO—$CH_3$, —$OPO_3H_2$, —OCO—$C_6H_5$, —$OSO_2$—($C_1$-$C_4$ alkyl) or —$OSO_2$—$N(C_1$-$C_4$ alkyl$)_2$.

3. A reactive dye according to claim 1, wherein Y is —Cl or —$OSO_3H$.

4. A reactive dye according to claim 1, wherein n is the number 2.

5. A reactive dye according to claim 1, wherein m is the number 3.

6. A reactive dye according to claim 1, wherein q is the number 1.

7. A reactive dye according to claim 1, wherein the benzene rings A, B and/or C are devoid of further substituents from the group $C_1$-$C_4$ alkyl, $C_1$-$C_4$ alkoxy and halogen.

8. A reactive dye according to claim 1, wherein $Z_1$ and $Z_2$ are each independently of the other vinyl or a radical —$CH_2$—$CH_2$—Y and Y is —Cl or —$OSO_3H$, n is the number 2, m is the number 3, q is the number 1, and the benzene rings A, B and/or C are devoid of further substituents from the group $C_1$-$C_4$ alkyl, $C_1$-$C_4$ alkoxy and halogen.

9. A reactive dye according to claim 1, wherein the reactive dye of formula (1) is a dye of formula

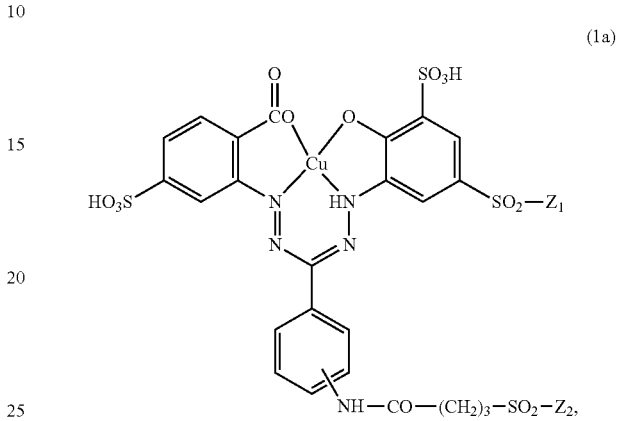

(1a)

wherein $Z_1$ is vinyl or a radical —$CH_2$—$CH_2$—Y and Y is —$OSO_3H$, and $Z_2$ is vinyl or a radical —$CH_2$—$CH_2$—Y and Y is —Cl.

10. A process for the preparation of the reactive dye of formula (1), which comprises reacting with one another a compound of formula

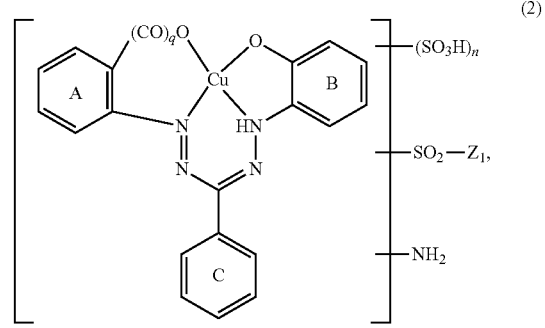

(2)

and a compound of formula

X—CO—$(CH_2)_m$—$SO_2$—$Z_2$ (3)

wherein X is a replaceable group, $Z_1$ and $Z_2$ are each independently of the other vinyl or a radical —$CH_2$—$CH_2$—Y and Y is a group removable under alkaline conditions, n is the number 1, 2, 3 or 4, m is the number 2, 3 or 4, q is the number 0 or 1, and the substituents —$(SO_3H)_n$, —$SO_2$—$Z_1$ and —$NH_2$ are bound to the benzene rings A, B and/or C, and said benzene rings A, B and/or C are optionally further substituted by at least one substituent selected from the group $C_1$-$C_4$ alkyl, $C_1$-$C_4$ alkoxy and halogen.

11. A process for the dyeing or printing of hydroxyl-group-containing or nitrogen-containing fibre materials, wherein a reactive dye according to claim 1 is used.

12. An aqueous ink comprising the reactive dye of claim 1.

13. A process for ink-jet printing, wherein an aqueous ink according to claim 12 is used.

14. A cellulosic fibre material dyed using a reactive dye according to claim 1.

15. A process for the dyeing or printing of hydroxyl-group-containing or nitrogen-containing fibre materials with a reactive dye according to claim 10.

* * * * *